US012593242B2

(12) United States Patent
Rahman

(10) Patent No.: US 12,593,242 B2
(45) Date of Patent: Mar. 31, 2026

(54) APPLICATION SPECIFIC TRANSMISSION CONTROL PROTOCOL PROFILE PARAMETERS TO IMPROVE RESILIENCY IN COMMUNICATION SERVICES

(71) Applicant: T-MOBILE INNOVATIONS LLC, Overland Park, KS (US)

(72) Inventor: Muhammad Tawhidur Rahman, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 214 days.

(21) Appl. No.: 18/226,681

(22) Filed: Jul. 26, 2023

(65) Prior Publication Data

US 2025/0039734 A1    Jan. 30, 2025

(51) Int. Cl.
　　*H04W 28/02* (2009.01)
　　*H04L 69/16* (2022.01)
　　*H04W 80/06* (2009.01)

(52) U.S. Cl.
　　CPC ......... *H04W 28/0273* (2013.01); *H04L 69/16* (2013.01); *H04W 80/06* (2013.01)

(58) Field of Classification Search
　　CPC ..... H04L 69/16; H04L 69/161; H04L 69/163; H04L 69/329; H04L 47/193; H04W 28/0273; H04W 28/10; H04W 28/18; H04W 80/06; H04W 40/02
　　See application file for complete search history.

(56) References Cited

U.S. PATENT DOCUMENTS

| | | | |
|---|---|---|---|
| 2006/0007934 A1 | 1/2006 | Chemiakina et al. | |
| 2013/0060893 A1 | 3/2013 | Harvell et al. | |
| 2014/0289383 A1* | 9/2014 | Draznin | H04L 67/141 709/222 |
| 2015/0026315 A1* | 1/2015 | Bergman | H04L 41/5041 709/220 |

FOREIGN PATENT DOCUMENTS

| | | |
|---|---|---|
| JP | 2003-018205 A | 1/2003 |
| KR | 10-2005-0099759 A | 10/2005 |

OTHER PUBLICATIONS

Extended European Search Report received for European Application No. 24188566.4, mailed on Dec. 6, 2024, 11 pages.
Office Action received for European Application No. 24188566.4, mailed on Feb. 4, 2026, 6 pages.

* cited by examiner

*Primary Examiner* — Peter Chen
(74) *Attorney, Agent, or Firm* — Shook, Hardy & Bacon

(57) ABSTRACT

System and method for creating application-specific TCP profiles to customize TCP parameters for an individual application that operates in the application layer of an OSI model. TCP parameters are set for a specific TCP profile that corresponds to the application. The TCP profiles are stored, and later selected and implemented when characteristics of the application are detected in the application layer.

8 Claims, 4 Drawing Sheets

100

APPLICATION LAYER ∽170

PRESENTATION LAYER ∽160

SESSION LAYER ∽150

TRANSPORT LAYER ∽140

NETWORK LAYER ∽130

DATA LINK LAYER ∽120

PHYSICAL LAYER ∽110

OSI Model

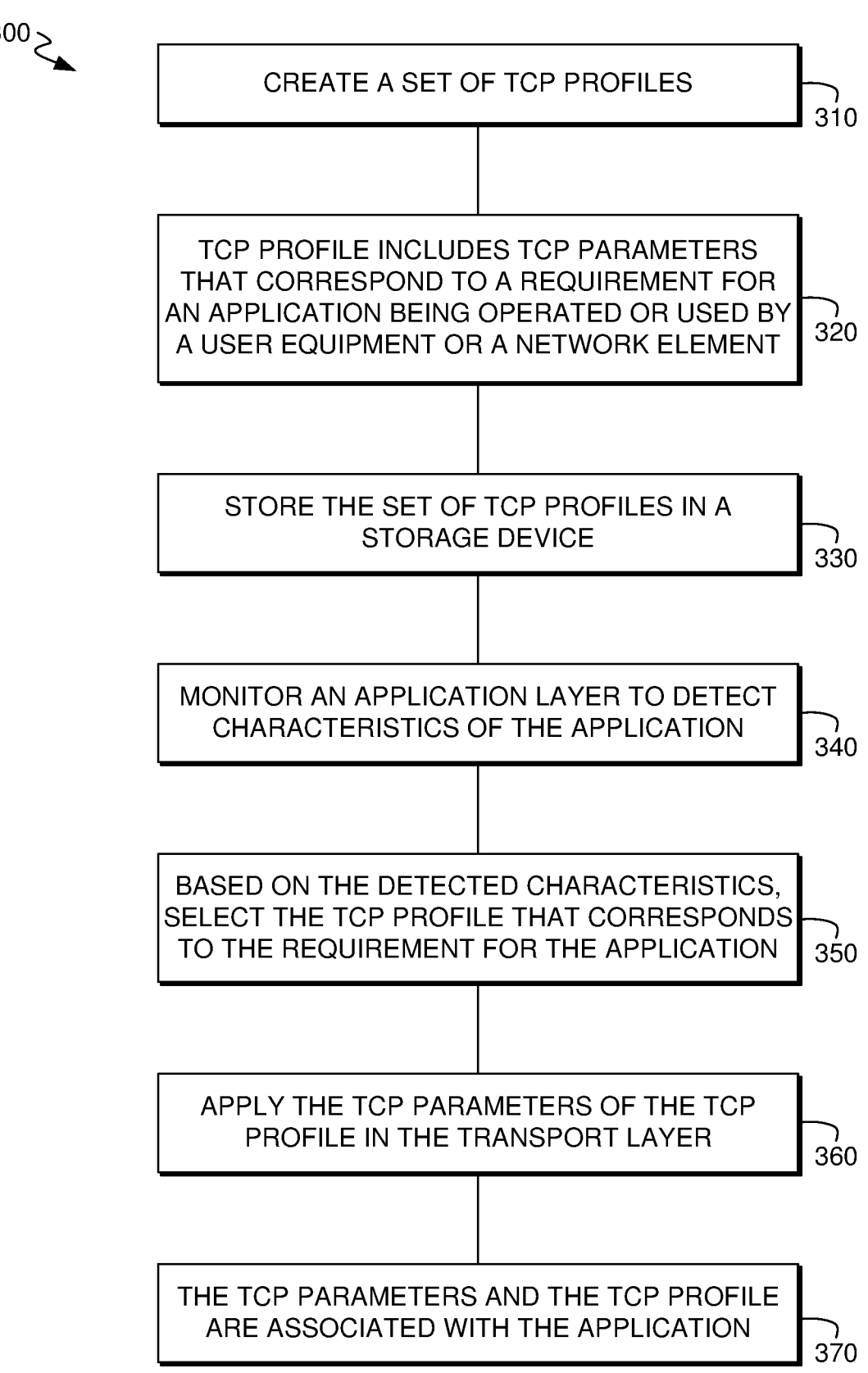

300

CREATE A SET OF TCP PROFILES — 310

TCP PROFILE INCLUDES TCP PARAMETERS THAT CORRESPOND TO A REQUIREMENT FOR AN APPLICATION BEING OPERATED OR USED BY A USER EQUIPMENT OR A NETWORK ELEMENT — 320

STORE THE SET OF TCP PROFILES IN A STORAGE DEVICE — 330

MONITOR AN APPLICATION LAYER TO DETECT CHARACTERISTICS OF THE APPLICATION — 340

BASED ON THE DETECTED CHARACTERISTICS, SELECT THE TCP PROFILE THAT CORRESPONDS TO THE REQUIREMENT FOR THE APPLICATION — 350

APPLY THE TCP PARAMETERS OF THE TCP PROFILE IN THE TRANSPORT LAYER — 360

THE TCP PARAMETERS AND THE TCP PROFILE ARE ASSOCIATED WITH THE APPLICATION — 370

*FIG. 3.*

APPLICATION SPECIFIC TRANSMISSION CONTROL PROTOCOL PROFILE PARAMETERS TO IMPROVE RESILIENCY IN COMMUNICATION SERVICES

CROSS-REFERENCE TO RELATED APPLICATIONS

None.

BACKGROUND

A global setting of a transmission control protocol (TCP) is a setback. No single setting for TCP can work effectively for all sorts of applications and services. Currently, TCP parameters have one settings regardless of traffic flow.

The Open Systems Interconnection (OSI) model is a conceptual framework that standardizes and defines the functions of a communication system or network into seven distinct layers. FIG. 100 shows and exemplary illustration 100 of the OSI Model. Each layer of the OSI model represents a specific set of functions and provides services to the layer above it while utilizing the services of the layer below it. The layers are arranged hierarchically, and each layer focuses on a specific aspect of network communication. The seven layers of the OSI model are the Physical Layer 110, Data Link Layer 120, Network Layer 130, Transport Layer 140, Session Layer 150, Presentation Layer 160, and Application Layer 170.

Transmission Control Protocol (TCP) is the heart of internet communication. TCP is well adopted as a 'Transport Layer' protocol not just for the Internet, but also heavily used as a transport layer protocol within 4G and 5G cellular communication networks between user equipment (UE) and a core network, and also within different network elements within the core network. For example, the Session initiation Protocol (SIP), which works as an application layer protocol that delivers control signaling during various real time services, such as voice, messaging, Rich Communication Services (RCS) under IP Multimedia Subsystem (IMS) service umbrella in a mobile network, also relies on TCP to get transported to and from the UE and network equipment. Another example of communication is between the UE and packet core network in 4G, 5G and various elements in the communication flow. The relevance of TCP is very pervasive. The governing parameters of TCP, such as Maximum Transmission Unit (MTU), Maximum Segment Size (MSS), various timers specific to TCP, are all common regardless of applications. While this approach is generally okay and remained effective for most part, there are situations in a wireless network wherein a service specific TCP profile could have been beneficial to treat each of those services based on separate TCP profile settings instead of one global setting. Lack of such flexibility in TCP layer parameters can sometime pose a risk of treating a TCP flow for sensitive real time service like voice setup signaling to get impacted. The recipe that works for data would not work for voice in all the cases. This can often handicap a mobile operator to not act on such scenarios, as by making a tradeoff to improve voice would then cause issues for data.

Accordingly, the best approach would be to de-couple TCP from having one set service setting and get to a method to apply service-specific TCP profile settings to respective equipment, including mobile handsets or User Equipment (UE) and network equipment such as the Mobility Management Entity (MME), Access and Mobility Management Function (AMF), etc.

SUMMARY

Embodiments of the present disclosure include implementing application-specific transmission control protocol (TCP) parameters. A set of TCP profiles is created. A TCP profile includes TCP parameters that correspond to a requirement for an application being operated or used by a user equipment or a network element. The set of TCP profiles is stored in a storage device. An application layer is monitored to detect characteristics of the application. Based on the detected characteristics, the TCP profile is selected that corresponds to the requirement for the application. The TCP parameters of the TCP profile are applied in the transport layer. The TCP parameters and the TCP profile are associated with the application.

BRIEF DESCRIPTION OF THE DRAWINGS

Illustrative embodiments of the present disclosure are described in detail below with reference to the attached drawing figures, and wherein:

FIG. 3 illustrates a process for implementing application-specific TCP parameters, according to an implementation of an embodiment of the present disclosure.

DETAILED DESCRIPTION

Figure 1:
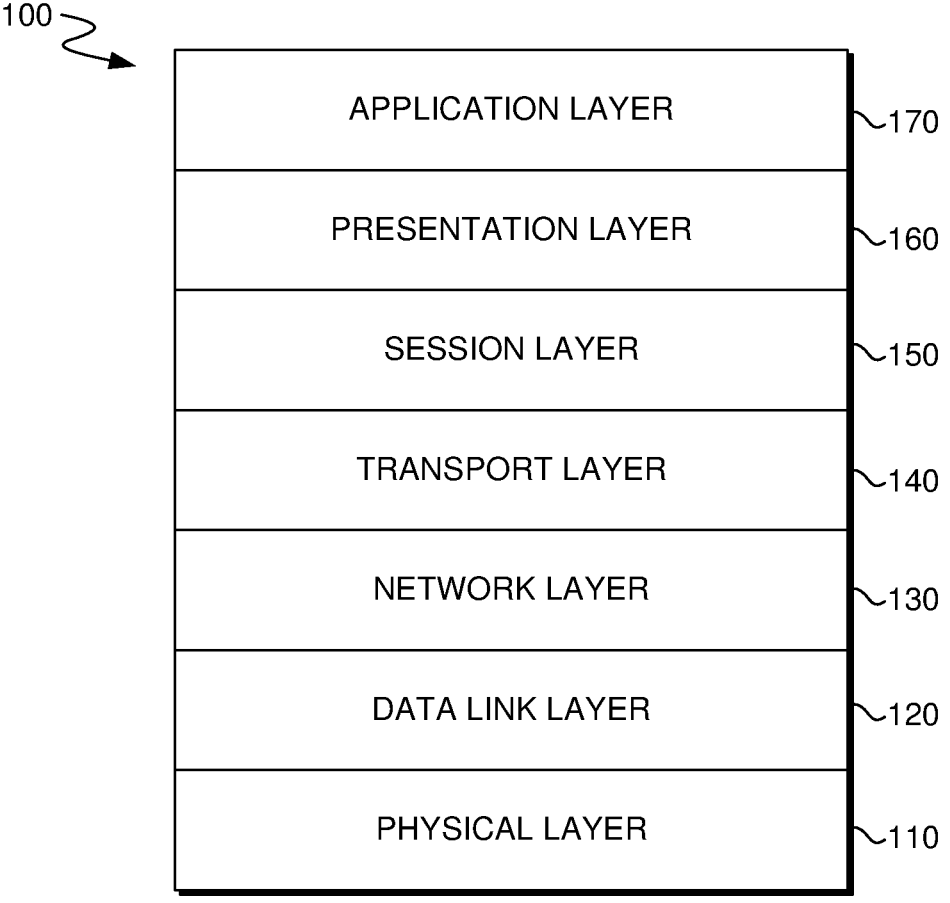
FIG. 1 illustrates an exemplary OSI model, according to an implementation of an embodiment of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |

3
-continued

| | |
|---|---|
| 5G | Fifth-Generation Cellular Communication System |
| 5GCN | 5G Core Network |
| BS | Base Station |
| CD-ROM | Compact Disk Read Only Memory |
| CPE | Customer Premise Equipment |
| DVD | Digital Versatile Discs |
| EEPROM | Electrically Erasable Programmable Read Only Memory |
| FWA | Fixed Wireless Access |
| gNB or gNodeB | Next Generation Node B |
| GPRS | General Packet Radio Service |
| GSM | Global System for Mobile communications |
| HINT | Home Internet |
| IMS | IP Multimedia Subsystem |
| IP | Internet Protocol |
| LTE | Long Term Evolution |
| MD | Mobile Device |
| ME | Mobile Equipment |
| MIMO | Multiple-Input Multiple-Output |
| mmWave | Millimeter Wave |
| OS | Operating System |
| PC | Personal Computer |
| PCS | Personal Communications Service |
| RAM | Random Access Memory |
| RAN | Radio Access Network |
| RF | Radio-Frequency |
| RFI | Radio-Frequency Interference |
| ROM | Read Only Memory |
| SMF | Session Management Function |
| TDMA | Time Division Multiple Access |
| UDP | User Data Protocol |
| UE | User Equipment |
| WCDMA | Wideband Code Division Multiple Access |
| WiMAX | Worldwide Interoperability for Microwave Access |

Aspects herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include random access memory (RAM), read-only memory (ROM), electrically erasable programmable read-only memory (EEPROM), flash memory or other memory technology, compact disk read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more nodes (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station," "node," and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

In a first aspect, a method of implementing application-specific transmission control protocol (TCP) parameters is provided that includes creating a set of TCP profiles. A TCP profile includes TCP parameters that correspond to a requirement for an application being operated or used by a server or a client. The set of TCP profiles is stored in a storage device. An application layer is monitored to detect characteristics of the application. Based on the detected characteristics, the TCP profile that has the requirement for the application is selected. The TCP parameters of the TCP profile are applied in the transport layer. The TCP parameters and the TCP profile are associated with the application.

TCP is a widely used transport layer protocol in computer networks. TCP defines several parameters that control its behavior during communication. Some of the important TCP parameters include:

Window Size: The window size determines the amount of data that can be sent without receiving an acknowledgment from the receiver. It is specified in bytes and helps regulate the flow of data between the sender and receiver.

Maximum Transmission Unit (MTU): MTU is a size of the largest data packet that a device will accept.

Maximum Segment Size (MSS): MSS is the largest amount of data that TCP can send in a single TCP segment. It is negotiated during the TCP handshake and depends on the MTU of the underlying network.

Initial Sequence Number (ISN): The ISN is a random number chosen by the sender to establish a starting point for the TCP sequence numbers. It ensures that each TCP connection has a unique sequence number space.

Retransmission Timeout (RTO): RTO is the time interval that TCP waits before retransmitting a segment that has not been acknowledged. It is dynamically adjusted based on network conditions to adapt to varying delays and packet loss.

Congestion Window (CWND): CWND is a TCP congestion control parameter that regulates the number of unacknowledged packets a sender can have in the network at a given time. It dynamically adjusts based on network congestion and helps prevent network congestion collapse.

Slow Start Threshold (SSThresh): SSThresh is another congestion control parameter that determines when TCP transitions from slow start to congestion avoidance phase. It is dynamically adjusted based on network conditions and helps regulate the rate of data transmission.

Maximum Segment Lifetime (MSL): MSL is the maximum amount of time a TCP segment can survive in the network. It is primarily used for connection termination and ensures that segments from terminated connections do not persist indefinitely.

Maximum Retransmission Attempts: TCP specifies a maximum number of retransmission attempts for unacknowledged segments before considering the connection as failed. This parameter helps ensure that TCP does not waste excessive resources on unresponsive connections.

These are some of the important TCP parameters that influence the behavior and performance of TCP connections. Different TCP implementations and operating systems may have additional or slightly different parameters.

In an implementation of an embodiment of the present disclosure, mobile operators are able to choose customized settings on TCP protocol controlling parameters (MTU, MSS, TCP timers, retry algorithm) differently for different services. Such flexibility can open an opportunity for mobile operators to improve the service level for their customers as the transport layer in the communication flow can be more robust and tuned to the need of actual services.

A system can include a variety of equipment that operates in a communications network. For example, the system can be a mobile communications network for 4G or 5G.

The system for 4G mobile communications network refers to the overall framework and structure of the network that enables the delivery of 4G services and capabilities. Some of the key components of the 4G system are the following: User Equipment (UE) refers to the mobile devices used by individuals, such as smartphones, tablets, or laptops, which connect to the 4G network. Base Station (BS), also known as an eNodeB (evolved NodeB), acts as a communication interface between the user equipment and the core network. The BS provides the wireless coverage in a specific geographic area and handles tasks such as signal transmission, reception, and resource allocation. Evolved Packet Core (EPC) is the central part of the 4G network architecture and consists of several components responsible for various functions:

a. Mobility Management Entity (MME) manages the mobility of user equipment within the network and handles tasks like authentication, security, tracking, and session management.

b. Serving Gateway (S-GW) acts as an interface between the base station and the core network, and routes data packets between the UE and the Packet Data Network (PDN) Gateway.

c. Packet Data Network (PDN) Gateway (P-GW) connects the 4G network to external networks, such as the internet or private networks, and manages IP address allocation, packet filtering, and quality of service (QOS) enforcement.

d. Policy and Charging Rules Function (PCRF) is responsible for policy enforcement and controlling charging parameters based on service requirements and user profiles.

In continuing, the additional key components of the 4G system include Backhaul Network, which provides the transport infrastructure that connects the base stations to the core network, and carries the user data and signaling traffic between the base stations and the EPC. Authentication and Key Agreement (AKA) authenticates the user equipment and ensures secure communication by establishing session keys between the UE and the network. Radio Access Network (RAN) includes the base stations and the radio network controllers that manage the radio resources and ensure efficient utilization of the wireless spectrum.

Overall, the 4G system is designed to provide high-speed data transfer, low latency, and support for various multimedia applications, and enables faster internet browsing, video streaming, online gaming, and other bandwidth-intensive activities on mobile devices.

The system for a 5G mobile communications network refers to the overall framework and structure of the network that enables the delivery of 5G services and capabilities. It involves various components and layers that work together to provide high-speed, low-latency, and reliable communication between devices. Some of the key components of the 5G system are the following: User Equipment (UE) refers to the devices used by end-users, such as smartphones, tablets, or Internet of Things (IoT) devices, which connect to the 5G network. Radio Access Network (RAN) includes the base stations, also known as gNodeBs (gNBs), which are responsible for transmitting and receiving wireless signals between the UE and the core network. The RAN also encompasses technologies like beamforming and Massive MIMO (Multiple Input Multiple Output) to enhance network capacity and coverage. Core Network (CN) is responsible for managing and controlling the overall operation of the 5G network. It consists of several functional elements:

a. Access and Mobility Management Function (AMF) handles the mobility of UEs, session management, and security-related functions.

b. Session Management Function (SMF) manages the session establishment, modification, and termination, as well as user plane processing and traffic routing.

c. User Plane Function (UPF) handles packet routing and forwarding, as well as Quality of Service (QOS) management for data transmission.

d. Policy Control Function (PCF) manages policy enforcement, such as QoS policies, and provides policy-related information.

e. Authentication Server Function (AUSF) handles the authentication and security-related functions.

f. Unified Data Management (UDM) stores user-related data, such as subscriber profiles and authentication credentials.

g. Network Exposure Function (NEF) provides APIs for external applications to access network functions and services.

h. Network Slice Selection Function (NSSF) assists in selecting and configuring network slices tailored to specific service requirements.

i. Network Function Virtualization Infrastructure (NFVI) provides the virtualization platform to deploy and manage virtualized network functions.

In continuing, the additional key components of the 5G system include Service-Based Architecture (SBA) that utilizes modular and distributed network functions, allowing flexibility, scalability, and efficient service delivery. Network Slicing allows the creation of virtual, independent network instances on a shared physical infrastructure. Network slices can be tailored to specific requirements, such as low latency for autonomous vehicles or high bandwidth for multimedia applications.

The above-listed components of the 5G system work together to provide the capabilities and features of 5G, including high data rates, ultra-low latency, massive device connectivity, and support for a wide range of applications and services. The architecture is designed to accommodate the diverse requirements of different service providers and industries, and enable the deployment of use cases in sectors like healthcare, transportation, smart cities, and more.

Figure 2:
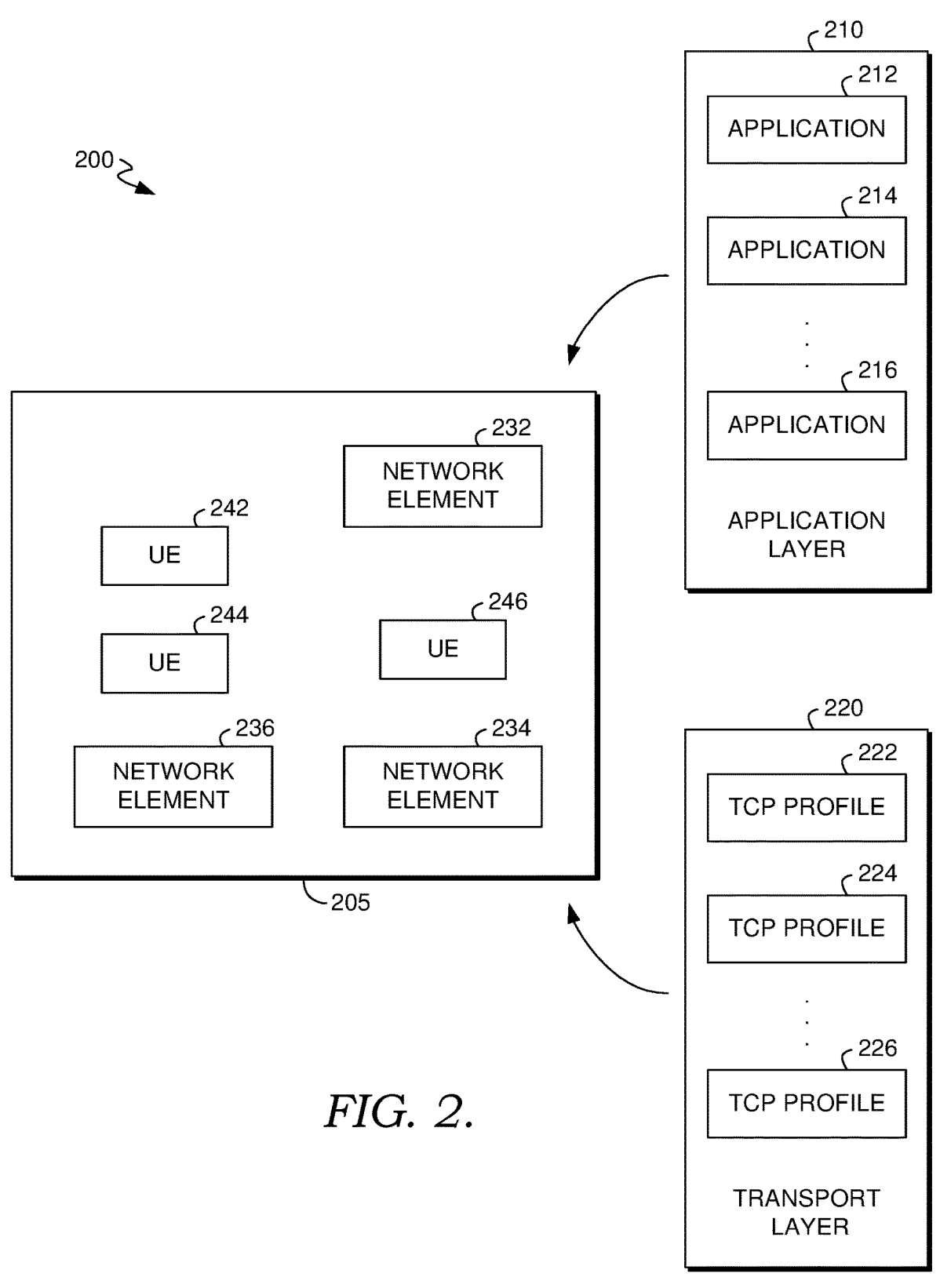
FIG. 2 illustrates an exemplary wireless system, according to an implementation of an embodiment of the present disclosure.

Turning now to FIG. 2, a wireless system 200 is shown with a wireless network 205, an application layer 210, and a transport layer 220. As one or ordinary skill knows, application layer 210 and transport layer 220 corresponds to application layer 170 and transport layer 140 in illustration 100. However, here, application layer 210 includes a number of applications 212, 214, and 216 that may operate in application layer 210. The applications are not limited to the ones that are shown, but are an exemplary illustration of applications that my function at the application layer in an OSI model.

Likewise, transport layer 220 corresponds to a number of TCP profiles that may exist. Here, TCP profiles 222, 224, and 226 illustrate a variety of profiles that can exists and are not limited to the ones that are shown. As discussed throughout this disclosure, each TCP profile holds a number of TCP parameters, which have been customized and set for a particular application that functions in the application layer. Therefore, rather than set one number for a TCP parameter, a customized TCP profile can be selected for an application, which contain a number of customized TCP parameters. Different TCP profiles can have different TCP parameters.

Going back to wireless network 205, the interplay of applications and TCP profiles will occur in the various elements shown by user equipment 242-246 and network elements 232-236. When a user operating a user equipment want to operate an application, a stored TCP profile with a number of pre-set TCP parameters is selected an implemented in the transport layer. The TCP profile may be stored in one of the network elements or another device. For example, application traffic could include a user watching YouTube videos, NetFlix programs, or operating another type of application. The application could also include things, like a voice call or any activity that allows for an interaction with a UE or server, an image, or a text message. Various applications can be determined at the application layer. A TCP profile is selected for each of these applications. More particularly, different types of TCP profiles are set for different types of traffic flow with governing parameters that are customized for different types of applications. The application can be detected by the behavioral characteristics for the application. For example, a human interaction for an input response can give rise to an identification of the application that is requesting the information. Certain types of inputs and interactions are required for Netflix application, which are different from the inputs and interactions for a YouTube video. By setting TCP profiles that have customized TCP parameters for applications, the invention improves reliability, speed, quality, and human interaction improvement. A service provider can set TCP profiles based on traffic needs, customer needs, and capacity.

In FIG. 3, a method for implementing application-specific TCP parameters is provided in a process 300. In a step 310, TCP profiles 222, 224 and 226 are created. In a step 320, the TCP profile (222, 224, or 226) includes TCP parameters that correspond to a requirement for an application (212, 214, or 216) being operated or used by user equipment (242, 244, or 246) or a network element (232, 234, or 236). TCP profiles 222, 224, and 226 are stored in a storage device, in a step 330. In a step 340, application layer 210 is monitored to detect characteristics of application 212, 214, or 216. In a step 350, based on the detected characteristics, TCP profile 222, 224, or 226 is selected that corresponds to the requirement for application 212, 214, or 216. TCP parameters for TCP profile 222, 224, or 226 are applied in the transport layer 220, in a step 360. In a step 370, the TCP parameters and the corresponding TCP profile are associated with the particular application.

Figure 4:
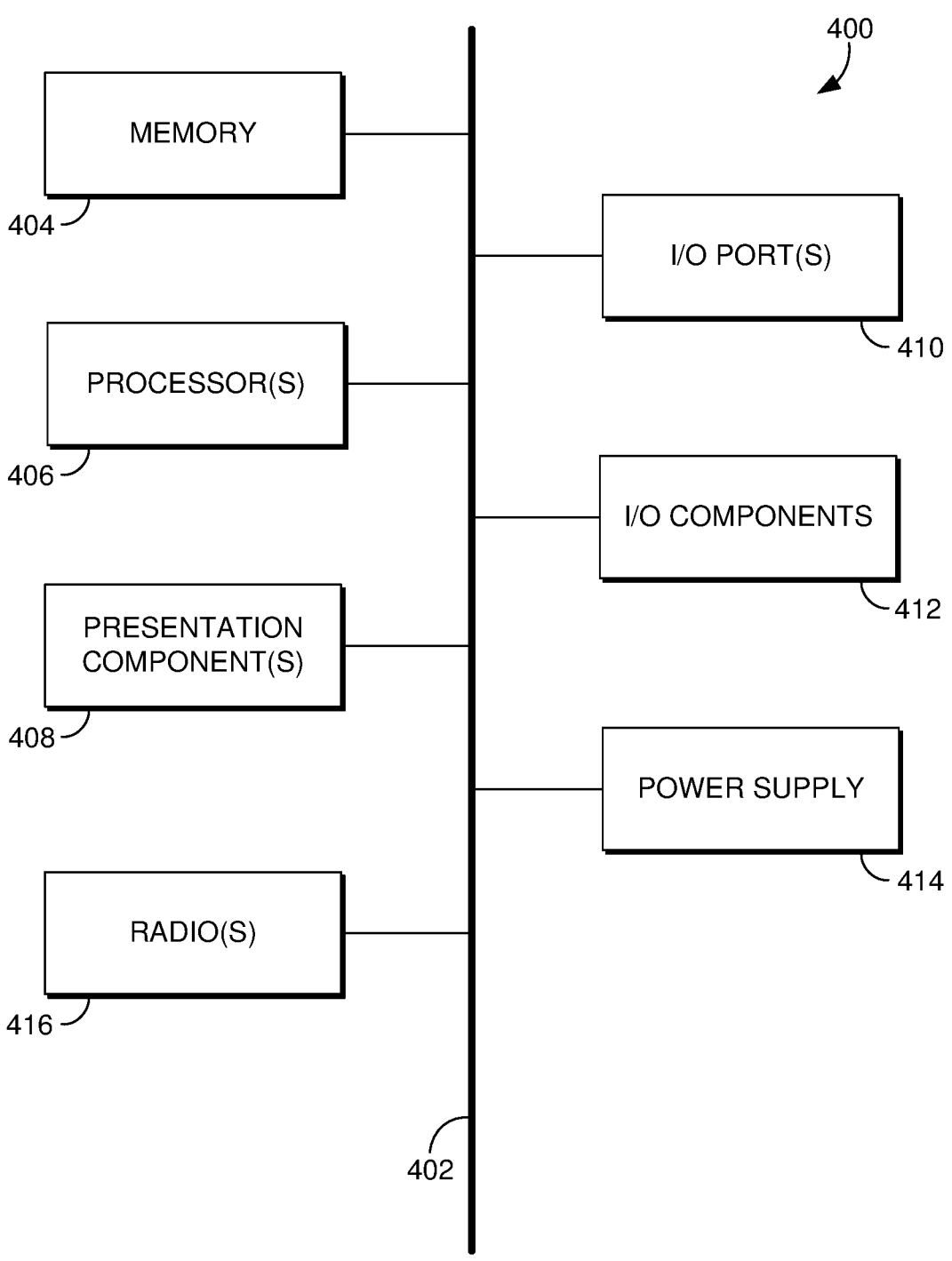
FIG. 4 depicts an exemplary computing system for a scanner in accordance with an embodiment of the present disclosure.

Referring to FIG. 4, a block diagram of an exemplary computing device 400 is provided, in accordance with an embodiment of the present disclosure. It should be noted that although some components in FIG. 4 are shown in the singular, they may be plural. For example, the computing device 400 might include multiple processors or multiple radios. As shown in FIG. 4, computing device 400 includes a bus 402 that directly or indirectly couples various components together, including memory 404, processor(s) 406, presentation component(s) 408 (if applicable), radio(s) 416, input/output (I/O) port(s) 410, input/output (I/O) component(s) 412, and a power supply 414.

Memory 404 may take the form of memory components described herein. Thus, further elaboration will not be provided here, but it should be noted that the memory 404 may include any type of tangible medium that is capable of storing information, such as a database. A database may be any collection of records, data, and/or information. In one embodiment, memory 404 may include a set of embodied computer-executable instructions that, when executed, facilitate various functions or elements disclosed herein. These embodied instructions will variously be referred to as "instructions" or an "application" for short. Processor 406 may actually be multiple processors that receive instructions and process them accordingly. In addition to other processes, in one embodiment processor 406 may process image data acquired by the scanner and its related electronics, for the purpose of decoding optical information. Presentation component 408 may include a display, a speaker, and/or other components that may present information (e.g., a display, a screen, a lamp (LED), a graphical user interface (GUI), and/or even lighted keyboards) through visual, auditory, and/or tactile cues.

The radio 416 may facilitate communication with a network, and may additionally or alternatively facilitate other types of wireless communications, such as Wi-Fi, WiMAX, LTE, and/or other VoIP communications. In various embodiments, the radio 416 may be configured to support multiple technologies, and/or multiple radios may be configured and utilized to support multiple technologies.

The input/output (I/O) ports 410 may take a variety of forms. Exemplary I/O ports may include a USB jack, a stereo jack, an infrared port, a firewire port, other proprietary communications ports, and the like. Input/output (I/O) components 412 may comprise keyboards, microphones, speakers, touchscreens, and/or any other item usable to directly or indirectly input data into the computing device 400.

Power supply 414 may include batteries, fuel cells, or any other component that may act as a power source to supply power to the computing device 400 or to other scanning components, including through electrical connections or couplings. The power supply 414 may be configured to selectively supply power to different components independently and/or concurrently.

Overall, the present disclosure may be implemented by a service provider to improve a user's experience. The customization of TCP parameters to a specific application provides an efficiency to reduce latency and improve the overall quality of communication experience. As traffic flows change, the service provider can manipulate the same TCP parameters in each TCP profile to handle network changes that are encountered.

The present disclosure has been described in relation to particular embodiments, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and subcombinations are of utility and may be employed without reference to other features and subcombinations and are contemplated as within the scope of the claims.

The invention claimed is:

1. A method of implementing application-specific transmission control protocol (TCP) parameters, comprising:

creating a set of TCP profiles, wherein a TCP profile includes TCP parameters that corresponds to a requirement for an application being operated or used by a user equipment or a network element, wherein the TCP parameters include a window size, maximum transmission unit, maximum segment size, initial sequence number, retransmission timeout, congestion window, slow start threshold, maximum segment lifetime, retransmission attempts, timers, and retry algorithm;

storing the set of TCP profiles in a storage device;

monitoring an application layer to detect characteristics of the application;

based on the detected characteristics, selecting the TCP profile that corresponds to the requirement for the application; and applying the TCP parameters of the TCP profile in the transport layer, wherein the TCP parameters and the TCP profile are associated with the application.

2. The method of claim 1, wherein the application is a software that allows a user to interact in a network in the application layer with another user or another application, or to interface to the network in the application layer.

3. The method of claim 2, wherein the user equipment is a mobile device.

4. The method of claim 2, wherein the network element is at least one of a base station, eNodeB, or gNodeB.

5. A system for implementing application-specific transmission control protocol (TCP) parameters, comprising:

one or more processors operating in a mobile communication network, wherein the one or more processors are coupled respectively to one or more memories;

the one or more processors connected to at least one storage device;

a set of network elements and user equipment operate in the mobile communication network;

the one or more processors operate to create a set of TCP profiles based on information that is input into the one or more processors from a service provider, wherein a TCP profile includes TCP parameters that corresponds to a requirement for an application being operated or used by a user equipment or a network element, wherein the TCP parameters include a window size, maximum transmission unit, maximum segment size, initial sequence number, retransmission timeout, congestion window, slow start threshold, maximum segment lifetime, retransmission attempts, timers, and retry algorithm;

the one or more processors store the set of TCP profiles in the at least one storage device;

the one or more processors monitor an application layer to detect characteristics of the application;

based on the detected characteristics, the one or more processors select the TCP profile that corresponds to the requirement for the application; and the one or more processors apply the TCP parameters of the TCP profile in the transport layer to at least one of a UE or a network element, wherein the TCP parameters and the TCP profile are associated with the application.

6. The system of claim 5, wherein the application is a software that allows a user to interact in a network in the application layer with another user or another application, or to interface to the network in the application layer.

7. The system, of claim 6, wherein the user equipment is a mobile device.

8. The system of claim 6, wherein the network element is at least one of a base station, eNodeB, or gNodeB.

* * * * *